(12) United States Patent
Yano

(10) Patent No.: US 7,737,192 B2
(45) Date of Patent: Jun. 15, 2010

(54) PROCESS FOR PRODUCING FLEXIBLE POLYURETHANE FOAM

(75) Inventor: Tadashi Yano, Anjo (JP)

(73) Assignee: INOAC Corporation, Aichi (JP)

( * ) Notice: Subject to any disclaimer, the term of this patent is extended or adjusted under 35 U.S.C. 154(b) by 879 days.

(21) Appl. No.: 11/190,810

(22) Filed: Jul. 28, 2005

(65) Prior Publication Data
US 2006/0025489 A1 Feb. 2, 2006

(30) Foreign Application Priority Data

Jul. 28, 2004 (JP) .......................... P.2004-220409
Nov. 16, 2004 (JP) .......................... P.2004-331737

(51) Int. Cl.
*C08G 18/48* (2006.01)

(52) U.S. Cl. ...................... 521/120; 521/123; 521/130; 521/170; 521/174

(58) Field of Classification Search ................ 521/120, 521/130, 170, 174, 123
See application file for complete search history.

(56) References Cited

U.S. PATENT DOCUMENTS

| | | | |
|---|---|---|---|
| 3,751,392 A | | 8/1973 | Olstowski et al. |
| 3,928,521 A | | 12/1975 | Haren et al. |
| 4,315,078 A | * | 2/1982 | Anorga ........................ 521/103 |
| 4,968,724 A | * | 11/1990 | Mascioli ...................... 521/103 |
| 5,173,559 A | * | 12/1992 | Muller et al. ................. 528/44 |
| 5,264,515 A | * | 11/1993 | Cody et al. ................... 528/10 |
| 5,719,200 A | | 2/1998 | Staendeke et al. |

FOREIGN PATENT DOCUMENTS

| | | |
|---|---|---|
| GB | 1214478 A | 12/1970 |
| JP | 51-115598 A | 10/1976 |
| JP | 54-149796 A | 11/1979 |
| JP | 58-067713 A | 4/1983 |
| JP | 05-214064 | 8/1993 |
| JP | 06-001820 | 1/1994 |
| JP | 08-511301 | 11/1996 |
| WO | WO 90/03997 | 4/1990 |

OTHER PUBLICATIONS

Database WPI, Section Ch, Week 198002, Derwent Publications Ltd., London, GB; AN 1980-02484C, XP-002354232.
Database WPI, Section Ch, Week 198322, Derwent Publications Ltd., London, GB; AN 1983-52597K, XP-002354233.
Database WPI, Section Ch, Week 197648, Derwent Publications Ltd., London, GB; AN 1976-89444X, XP-002354234.

* cited by examiner

*Primary Examiner*—John Cooney
(74) *Attorney, Agent, or Firm*—Sughrue Mion, PLLC

(57) ABSTRACT

A flexible polyurethane foam is produced by blending a polyurethane raw material containing a polyol, a polyisocyanate, a blowing agent, and a catalyst with an inorganic compound hydrate having a specific gravity of 1.5 to 4.0 and reacting the above polyurethane raw material to effect foaming and curing. The inorganic compound hydrate is preferably an iron sulfate hydrate, a calcium sulfate hydrate, or a magnesium sulfate hydrate. The above inorganic compound hydrate preferably has decomposition temperature of from 100 to 170° C. Then, an increase in exothermic temperature owing to the above foaming and curing is diminished by evaporation of water formed through decomposition of the above inorganic compound hydrate.

5 Claims, 1 Drawing Sheet

PROCESS FOR PRODUCING FLEXIBLE POLYURETHANE FOAM

FIELD OF THE INVENTION

The present invention relates to a process for producing a flexible polyurethane foam for use as a cushion material which forms furniture, bedding, seats for automobiles, and the like.

BACKGROUND OF THE INVENTION

Hitherto, at the production of a flexible polyurethane foam having a density of 25 kg/m$^3$ or less, in the case that water alone is used as a blowing agent, exothermic temperature at foaming and curing reaches 170° C. or higher because the amount of water to be added increases. Therefore, there is a possibility of autoignition owing to oxidative degradation (scorch) of polyurethane and also coloration of the resulting flexible polyurethane foam occurs by scorch. In order to avoid such situations, it is known to add methylene chloride or liquid carbon dioxide as a blowing aid without changing the conventional amount of water to be added.

However, methylene chloride is one of substances exerting a bad influence on the environment and the like and hence its use is regulated. On the other hand, foaming with liquid carbon dioxide necessitates a specialized apparatus for feeding liquid carbon dioxide under high pressure and, for smooth foaming, production conditions are limited and also a production cost increases. Thus, for the purpose of absorbing heat, there is known a technology of adding a polyolefin powder such as polyethylene powder (for example, cf. JP-T-2002-532596 (page 2) and JP-A-6-199973 (pages 2 and 3)).

In the above conventional technology of adding a polyolefin powder, though an effect on the decrease of the exothermic temperature at foaming and curing is observed, it is necessary to increase the amount of the polyolefin powder in order to lower a calorific value effectively. In that case, the increased amount of the polyolefin powder results in too high density of the resulting flexible polyurethane foam and also deterioration in physical properties such as compressive residual strain. Since the polyolefin powder cannot be blended in a sufficient amount in order to prevent the deterioration of such physical properties, there is a problem that the exothermic temperature cannot be effectively lowered at foaming and curing and, as a result, coloration by scorch cannot be reduced.

SUMMARY OF THE INVENTION

The invention is conceived in consideration of such a problem present in the conventional technology. An object of the invention is to provide a process for producing a flexible polyurethane foam, which is capable of effectively lowering exothermic temperature at foaming and curing and of reducing coloration by scorch.

For achieving the above object, the process for producing a flexible polyurethane foam in the invention comprises blending a polyurethane raw material containing a polyol, a polyisocyanate, a blowing agent, and a catalyst with an inorganic compound hydrate having a specific gravity of 1.5 to 4.0 and reacting the above polyurethane raw material to effect foaming and curing, wherein an increase of exothermic temperature owing to the above foaming and curing is diminished by evaporation of water formed through decomposition of the above inorganic compound hydrate.

The process for producing a flexible polyurethane foam in the invention is characterized in that decomposition temperature of the above inorganic compound hydrate is preferably from 100 to 170° C.

The process for producing a flexible polyurethane foam in the invention is characterized in that the above inorganic compound hydrate is preferably an iron sulfate hydrate, a calcium sulfate hydrate, or a magnesium sulfate hydrate.

According to the invention, the following advantages can be exhibited.

In the process for producing a flexible polyurethane foam in the invention, a polyurethane raw material is blended with an inorganic compound hydrate having a specific gravity of 1.5 to 4.0 and the resulting polyurethane raw material is reacted to effect foaming and curing. Therefore, at the foaming and curing, the inorganic compound hydrate is decomposed by heating to thereby form water and heat generation owing to the foaming and curing is diminished by depriving heat of vaporization (heat of evaporation) through evaporation of the water. Accordingly, the exothermic temperature at foaming and curing can be effectively lowered and, as a result, the color difference between a high temperature part and a low temperature part can be reduced, so that coloration of the resulting flexible polyurethane foam can be reduced.

Furthermore, since the specific gravity of the inorganic compound hydrate is from 1.5 to 4.0 which is larger than the conventional polyolefin powder, the volume of the blended inorganic compound hydrate is small and thus there is a little risk of changing physical properties of the flexible polyurethane foam, such as density.

In the process for producing a flexible polyurethane foam in the invention, the decomposition temperature of the above inorganic compound hydrate is preferably set at from 100 to 170° C. Therefore, the decomposition of the inorganic compound hydrate starts at the time when temperature reaches to 100° C. or higher during the foaming and curing, whereby water forms and the formed water evaporates. Accordingly, the heat generation can be effectively diminished by the evaporation of the water and thus the advantage of the invention can be enhanced.

In the process for producing a flexible polyurethane foam in the invention, the inorganic compound hydrate is preferably an iron sulfate hydrate, a calcium sulfate hydrate, or a magnesium sulfate hydrate. These inorganic compound hydrates decompose with an increase in the temperature at the foaming and curing, whereby water forms and the formed water evaporates. Accordingly, the heat generation can be effectively diminished by the vaporization latent heat of the water and thus the advantage of the invention can be sufficiently exhibited.

DETAILED DESCRIPTION OF THE INVENTION

Figure 1:
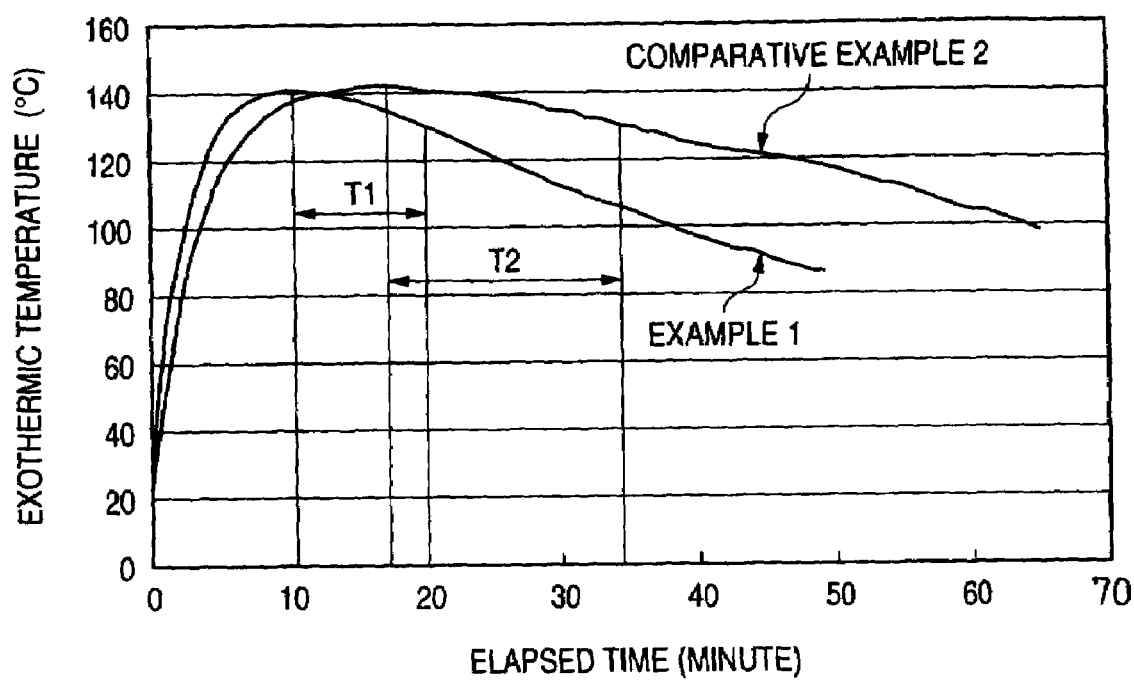
FIG. 1 is a graph showing a relationship between the exothermic temperature (° C.) and the elapsed time (minute) in Example 1 and Comparative Example 2.

The following will describe embodiments of the invention in detail.

The low-density flexible polyurethane foam (hereinafter also simply referred to as foam) in the present embodiment is produced as follows. Namely, it is produced by blending a polyurethane raw material containing a polyol, a polyisocyanate, a blowing agent, and a catalyst with an inorganic compound hydrate having a specific gravity of 1.5 to 4.0 and reacting the above polyurethane raw material to effect foaming and curing. The heat generation owing to the above foaming and curing is diminished by the latent heat of vaporization of the water formed through decomposition of the inorganic compound hydrate. When the temperature at the foaming and curing rises, for example, to 170° C. or higher, oxidative degradation of the foam, i.e., scorch is induced and coloration of the flexible polyurethane foam occurs. This phenomenon is suppressed by utilizing deprivation of heat of vaporization (heat of evaporation) of the water formed through decomposition of the inorganic compound hydrate. The foam of the present embodiment may be either a flexible slab stock foam produced by foaming and curing the material at room temperature under atmospheric pressure or a mold foam produced by charging the polyurethane raw material (reaction mixture liquid) into a mold and foaming and curing it under clamping the mold. In this case, since a bulky block having a height of about 1 m is generally shaped through continuous production in the case of the flexible slab stock foam, heat accumulation and yellowing tend to occur, so that the process of the present embodiment is effective as a measure against the yellowing by scorch.

First, the above polyurethane raw material will be described.

As the polyol, a polyether polyol or a polyester polyol is used. Of these, a polyether polyol is preferred since it is excellent in reactivity with a polyisocyanate and it is not hydrolyzed unlike a polyester polyol. As the polyether polyol, there may be used polyether polyol and a modified compound thereof composed of a polymer obtained by addition polymerization of polypropylene glycol, polytetramethylene glycol or polyhydric alcohol with propylene oxide or ethylene oxide. As the polyhydric alcohol, glycerin, dipropylene glycol, or the like may be mentioned.

As the polyether polyol, there may be specifically mentioned a triol obtained by addition polymerization of glycerin with propylene oxide and further ethylene oxide, a diol obtained by addition polymerization of dipropylene glycol with propylene oxide and further ethylene oxide, or the like. The polyethylene oxide unit in the polyether polyol is from about 10 to 30 mol %. When the content of the polyethylene oxide unit is high, hydrophilicity increases as compared with the case that the content is low and thus a mixing ability with a highly polar molecule such as a polyisocyanate compound is improved. As a result, the reactivity of the polyol is enhanced. In the polyol, the functionality of hydroxyl groups and the hydroxyl number thereof can be changed by controlling kinds of the material components, molecular weight, degree of condensation, and the like.

As the polyester polyol, there may be used a condensed polyester polyol obtained by reacting a polycarboxylic acid such as adipic acid or phthalic acid with a polyol such as ethylene glycol, diethylene glycol, propylene glycol, or glycerin, as well as a lactone-based polyester polyol and a polycarbonate-based polyol.

The polyisocyanate to be reacted with the above polyol is a compound having a plurality of isocyanate groups and there may be specifically used tolylene diisocyanate (TDI), 4,4-diphenylmethane diisocyanate (MDI), 1,5-naphthalene diisocyanate (NDI), triphenylmethane triisocyanate, xylylene diisocyanate (XDI), hexamethylene diisocyanate (HDI), dicyclohexylmethane diisocyanate, isophorone diisocyanate (IPDI), a modified product thereof, or the like. The isocyanate index of the polyisocyanate is 100 or less or may exceeds 100 but usually is in the range of about 90 to about 130. The isocyanate index means an equivalent ratio, represented as percentage, of the isocyanate group of the polyisocyanate to the hydroxyl group of the polyol and water as a blowing agent.

The blowing agent is used for foaming a polyurethane resin to form the flexible polyurethane foam. For example, pentane, cyclopentane, hexane, cyclohexane, dichloromethane, carbon dioxide, or the like is used in addition to water. In the case that the blowing agent is water, the blending amount is preferably from 7 to 13 parts by weight relative to 100 parts by weight of the polyol in order to achieve the density of the flexible polyurethane foam of 25 kg/m$^3$ or less. When the blending amount of water is less than 7 parts by weight, the extent of foaming is small and the density of the flexible polyurethane foam tends to exceed 25 kg/m$^3$. When the amount exceeds 13 parts by weight, the temperature at the foaming and curing is apt to increase and it is difficult to lower the temperature. By setting the blending amount of water as above, the density of the resulting flexible polyurethane foam can be usually made 15 to 25 kg/m$^3$.

The catalyst is used for accelerating the urethane-forming reaction between the polyol and the polyisocyanate and there may be specifically used a tertiary amine such as triethylenediamine, dimethylethanolamine, or N,N',N'-trimethylaminoethyl-piperazine, an organometallic compound such as tin octoate, an acetate salt, an alkali metal alcoholate, or the like. The polyurethane raw material is blended with a foam stabilizer, a crosslinking agent, a filler, a stabilizer, a colorant, a flame retardant, a plasticizer, and the like, if necessary. As the foam stabilizer, there may be used a silicone compound, anionic surface active agents such as sodium dodecylbenzenesulfonate or sodium laurylsulfate, a polyether siloxane, a phenolic compound, or the like.

The above inorganic compound hydrate having a specific gravity of 1.5 to 4.0 is a material which decomposes by heating and forms water through the decomposition. As the inorganic compound hydrate having a specific gravity of 1.5 to 4.0 there may be used calcium sulfate dihydrate ($CaSO_4.2H_2O$, dihydrate gypsum, specific gravity: 2.32, decomposition temperature: 128 to 163° C.), monohydrate to pentahydrate of iron sulfate ($FeSO_4.H_2O$ to $FeSO_4.5H_2O$, specific gravity: 2.97, decomposition temperature: 100 to 130° C.) or a mixture thereof, monohydrate to trihydrate of aluminum oxide ($Al_2O_3.H_2O$ to $Al_2O_3.3H_2O$, specific gravity: 2.4 to 3.4, decomposition temperature: 150 to 360° C.), pentahydrate of copper sulfate ($CuSO_4.5H_2O$ specific gravity: 2.29), monohydrate to heptahydrate of magnesium sulfate ($MgSO_4.H_2O$ to $MgSO_4.7H_2O$, specific gravity: 2.57 to 1.68, decomposition temperature: 150° C., average particle size: 50 μm), or the like. The hydrated water contained in the inorganic compound hydrate is stably present at room temperature as a solid crystal and is crystal water. As the inorganic compound hydrate, an iron sulfate hydrate, a calcium sulfate hydrate, or a magnesium sulfate hydrate is preferred. This is because these inorganic compound hydrates gradually decompose at a temperature of 100° C. or higher along the temperature increase at the foaming and curing of the polyurethane raw material to form water.

The specific gravity of the inorganic compound hydrate is necessarily from 1.5 to 4.0, preferably from 2.0 to 3.0. When the specific gravity is less than 1.5, a predetermined weight of the inorganic compound hydrate (powder) can be added only when a large volume of the hydrate is added to the polyurethane raw material, e.g., the polyol, but the powder and the polyol cannot be thoroughly mixed and stirred. In addition, the volume of the inorganic compound hydrate in the flexible polyurethane foam increases, which results in deterioration of physical properties as the flexible polyurethane foam. On the other hand, when the specific gravity exceeds 4.0, the inorganic compound hydrate is apt to precipitate during a long-term storage in the raw material of the flexible polyurethane foam, especially in the polyol, and the dispersibility into the reaction mixture liquid becomes worse, so that the function of the inorganic compound hydrate to lower the exothermic temperature decreases. The decomposition temperature of the inorganic compound hydrate having a specific gravity of 1.5 to 4.0 is preferably from 100 to 170° C. When the decomposition temperature is lower than 100° C., water is formed at an initial stage of the foaming and curing with the polyurethane raw material, i.e., at a stage of low exothermic temperature and hence there is a possibility that a bad influence may be exerted on the foaming and curing and the formed water may functions as a blowing agent. Incidentally, in the case of dihydrate gypsum, 1.5 mol of water out of 2 mol of water in the molecule is transformed into free water through decomposition when heated to 100° C. or higher.

The blending amount of the inorganic compound hydrate having a specific gravity of 1.5 to 4.0 is preferably from 3 to 150 parts by weight, more preferably from 20 to 100 parts by weight relative to 100 parts by weight of the polyol. When the blending amount is less than 3 parts by weight, the amount of water formed through decomposition is small and hence the increase in the exothermic temperature owing to the foaming and curing cannot be sufficiently diminished. On the other hand, when the blending amount exceeds 150 parts by weight, excessive water functions as a blowing agent and there is a possibility that the foaming reaction is accelerated to increase the exothermic temperature.

The inorganic compound hydrate is preferably blended as a combination of a plurality of hydrates, for example, a calcium sulfate hydrate and a magnesium sulfate hydrate. In that case, the function of the inorganic compound hydrate can be exhibited in a wide temperature range, so that the exothermic temperature at the foaming and curing can be effectively lowered and also the mixing amount of the inorganic compound hydrate can be reduced.

The polyurethane raw material is reacted to effect foaming and curing, whereby the flexible polyurethane foam is produced. The reaction at that time is complex and basically the following reactions mainly occur. Namely, they are an addition polymerization reaction between the polyol and the polyisocyanate (urethane formation reaction), a foaming reaction between the polyisocyanate and water as a blowing agent, and a crosslinking (curing) reaction between these reaction products and the polyisocyanate.

In the case that the polyurethane foam is produced, any of an one-shot method wherein a polyol and a polyisocyanate are directly reacted or a prepolymer method wherein a polyol and a polyisocyanate are reacted beforehand to obtain a prepolymer having an isocyanate group at a terminal and then it is reacted with a polyol is adopted.

The flexible polyurethane foam thus obtained has a density of 25 kg/m$^3$ or less, usually 15 to 25 kg/m$^3$, a compressive residual strain determined by JIS K 6400-4:2004 (Method A) of 5% or less, and a color difference between a high-temperature part and a low-temperature part at foaming and curing of 5 or less and contains an inorganic compound hydrate. The color difference herein is a difference in a yellow index ($\Delta YI$) between a high-temperature part and a low-temperature part at foaming and curing.

Thus, the flexible polyurethane foam has a low density, i.e., a density of 25 kg/m$^3$ or less and has a good cushioning property and a light weight. In general, a flexible polyurethane foam means one wherein cells (bubbles) have a communicating structure and restorability. In order to make the flexible polyurethane foam such a low density, it is necessary to achieve a high foaming ratio of 40 times or more. Moreover, a compressive residual strain is small and cushioning ability is maintained over a long period of time. Furthermore, since the color difference is small, there is no problem in view of coloration. Moreover, it is preferred that the hardness defined by JIS K 6400-2:2004 (Method D) is from 110 to 150 N, tensile strength defined by JIS K 6400-5:2004 is from 100 to 150 kPa, and elongation defined by JIS K 6400-5:2004 is from 100 to 200%. When the hardness exceeds 150 N, there is a possibility that the flexible polyurethane foam becomes too hard and cushioning ability decreases. In the flexible polyurethane foam, the inorganic compound derived from the inorganic compound hydrate remains but the inorganic compound hydrate has a specific gravity of 1.5 to 4.0 as described above and the volume is small, so that the influence on the physical properties of the flexible polyurethane foam is a little. The flexible polyurethane foam having such physical properties is suitably used as a cushioning material which forms furniture such as chairs and sofas, beddings such as beds, mattresses, pillows, seats for automobiles, and the like.

In the case that the flexible polyurethane foam is produced, an inorganic compound hydrate having a specific gravity of 1.5 to 4.0 is blended with a polyurethane raw material containing a polyether polyol, a polyisocyanate, water as a blowing agent, and an amine catalyst, for example. As the inorganic compound hydrate, for example, dihydrate gypsum or an iron sulfate hydrate is used. The flexible polyurethane foam is produced by reacting the polyether polyol with the polyisocyanate and also reacting the polyisocyanate with water to effect foaming and further curing.

In the production process, at the foaming and curing, the inorganic compound hydrate is heated to 100° C. or higher, whereby water combined as the hydrate is transformed into free water through decomposition and the formed water evaporates. The heat of vaporization is deprived through the evaporation of the water and the heat generation of the foam owing to the foaming and curing is diminished. Accordingly, the exothermic temperature at foaming and curing can be lowered. The temperature at foaming and curing of this invention can be suppressed to 170° C. or lower, while the temperature of the foam at foaming and curing sometimes reaches 170° C. or higher when the inorganic compound hydrate is not blended. Therefore, scorch of the foam induced by exposure to a high temperature of 170° C. or higher can be prevented.

The advantages exhibited by the above embodiment will be described in the following.

In the process for producing a flexible polyurethane foam in the present embodiment, an inorganic compound hydrate having a specific gravity of 1.5 to 4.0 is blended with a polyurethane raw material and a polyol and a polyisocyanate are reacted and also foaming is effected. Therefore, at forming and curing, the inorganic compound hydrate is decomposed by heating to form water, heat of vaporization is deprived through evaporation of the water, and thereby, the heat generation owing to foaming and curing is diminished. Accordingly, the exothermic temperature at foaming and curing can be effectively lowered and the descending rate of the temperature once increased can be accelerated. As a result, the color difference of the foam induced by generation of a high-temperature part and a low-temperature part can be reduced and thus coloration of the resulting flexible polyurethane foam can be reduced.

Furthermore, since the specific gravity of the inorganic compound hydrate is from 1.5 to 4.0, the volume of the inorganic compound hydrate blended is small and, as a result, there is a small risk that physical properties of the resulting flexible polyurethane foam, such as density, is changed.

Moreover, the inorganic compound hydrate has a decomposition temperature of preferably 100 to 170° C. Therefore, when temperature is increased to reach 100° C. or higher at foaming and curing, decomposition of the inorganic compound hydrate is started to form water and the formed water evaporates. Accordingly, the heat generation can be effectively diminished by vaporization latent heat of the water.

Furthermore, as the inorganic compound hydrate, an iron sulfate hydrate, a calcium sulfate hydrate, or a magnesium sulfate hydrate is preferred. These inorganic compound hydrates gradually decomposes at a temperature of 100° C. or higher along the temperature increase at foaming and curing to form water and the formed water evaporates. Accordingly, the heat generation can be effectively diminished by the evaporation of the water.

The flexible polyurethane foam obtained as mentioned above has a density of 15 to 25 kg/m$^3$, a compressive residual strain determined by JIS K 6400-4:2004 (Method A) of 5% or less, and a color difference of 5 or less and contains an inorganic compound hydrate having a specific gravity of 1.5 to 4.0. Therefore, it has a low density and a small compression residual strain and can exhibit good physical properties as a flexible polyurethane foam. Moreover, by diminishing excessive heat generation at foaming and curing, the oxidative degradation of the part which was conventionally a high-temperature part is decreased and, as a result, the color difference between the high-temperature part and the low-temperature part at foaming and curing is reduced. Accordingly, even when a product is made from both of the high-temperature inner part and the low-temperature surface part, a trouble due to coloration can be prevented. In addition, the inorganic compound derived from the inorganic compound hydrate having a specific gravity of 1.5 to 4.0 present in the flexible polyurethane foam hardly affects on the physical properties of the flexible polyurethane foam.

The following will describe the above embodiment further in detail with reference to Examples and Comparative Examples but the invention is not limited to these Examples.

EXAMPLES 1 TO 9 AND COMPARATIVE EXAMPLES 1 TO 3

First, the following show the inorganic compound hydrates having a specific gravity of 1.5 to 4.0 used in each Example and Comparative Example.

Dihydrate gypsum: dihydrate gypsum having a specific gravity of 2.32 and an average particle size of 40 μm Iron sulfate hydrate: a mixture of monohydrate to pentahydrate of iron sulfate having a specific gravity of 2.97 and an average particle size of 40 μm Magnesium sulfate hydrate: heptahydrate of magnesium sulfate having a specific gravity of 1.68 and an average particle size of 50 μm Polyethylene powder: a low-density polyethylene powder having a specific gravity of 0.93 and an average particle size of 40 μm, manufactured by Mitsui Chemicals, Inc.

Incidentally, heat of vaporization of water is 2259 J/g and melting latent heat of polyethylene powder is 198 J/g. Thus, the heat-absorbing effect of water is markedly excellent as compared with that of the polyethylene powder.

Mixtures were prepared by mixing a polyurethane raw material composed of a polyol, a polyisocyanate, a blowing agent, a foam stabilizer, and a catalyst each shown in Tables 1, 2 and 3 with the above inorganic compound hydrate having a specific gravity of 1.5 to 4.0. Comparative Example 1 shows an example wherein the inorganic compound hydrate having a specific gravity of 1.5 to 4.0 is not added and Comparative Examples 2 and 3 show examples wherein only the polyethylene powder is added.

Each of these mixture was poured into a foaming vessel having a size of 500 mm each of length, width, and depth and foamed at room temperature under atmospheric pressure, followed by a heating reaction (curing) by passing through a heating furnace, whereby a flexible slab stock foam was obtained. The resulting flexible slab stock foam was cut out to produce a sheet-shape polyurethane foam. With regard to the polyurethane foam, density, hardness, tensile strength, elongation, compressive residual strain, maximum exothermic temperature, time required for 10° C. of decrease from maximum exothermic temperature, and color difference were measured according to the following measuring methods. The results thereof were shown in Tables 1, 2 and 3. The meanings of symbols in Tables 1, 2 and 3 are shown in the following.

(Measuring Methods)

Density (kg/m$^3$): measured in accordance with JIS K 7222: 2004.

Hardness (N): measured in accordance with JIS K 6400-2:2004 (Method D).

Tensile strength (kPa): measured in accordance with JIS K 6400-5:2004.

Elongation (%): measured in accordance with JIS K 6400-5:2004.

Compressive residual strain (%): measured in accordance with JIS K 6400-4:2004 (Method A).

Maximum exothermic temperature (° C.): a thermocouple was inserted into a central part of the foaming vessel and the highest temperature shown during foaming and curing was determined.

Time required for 10° C. of decrease from maximum exothermic temperature: after maximum exothermic temperature (° C.) was measured, time (minute) required for 10° C. of decrease from maximum exothermic temperature was measured.

Color difference: degree of yellowing (degree of whiteness) was measured on a high-temperature part of the foam (central part) and a low-temperature part (side part) during foaming and heating reaction by a colorimeter [SM color computer SM-4, manufactured by Suga Test Instruments, Co., Ltd.] and color difference (ΔYI) between them was determined.

(Symbols in Tables 1, 2 and 3)

Polyol GP3000: polyether polyol manufactured by Sanyo Chemical Industries, Ltd., hydroxyl number: 56 (mg-KOH/g)

Amine catalyst LV33: an amine-based catalyst manufactured by Chukyo Yushi, Co., Ltd.

Silicone foam stabilizer B8110: manufactured by Goldschmidt

Stannous octoate MRH110: manufactured by Johoku Chemical, Co., Ltd.

Polyisocyanate T-80: toluene diisocyanate (tolylene diisocyanate, a mixture of 80% by weight of 2,4-tolylene diisocyanate and 20% by weight of 2,6-tolylen diisocyanate), manufactured by Nippon Polyurethane Industry Co., Ltd.

TABLE 1

|  | Example 1 | Example 2 | Example 3 | Example 4 | Example 5 | Example 6 |
|---|---|---|---|---|---|---|
| Polyol GP3000 | 100 | 100 | 100 | 100 | 100 | 100 |
| Water | 7.0 | 7.0 | 7.0 | 5.0 | 7.0 | 5.0 |
| Amine catalyst LV33 | 0.4 | 0.4 | 0.4 | 0.4 | 0.4 | 0.4 |
| Silicone foam stabilizer B8110 | 1.0 | 1.0 | 1.0 | 1.0 | 1.0 | 1.0 |
| Stannous octoate MRH110 | 0.2 | 0.2 | 0.2 | 0.2 | 0.2 | 0.2 |
| Polyisocyanate T-80 | 84.1 | 84.1 | 84.1 | 62.8 | 84.1 | 62.8 |
| Isocyanate index | 110 | 110 | 110 | 110 | 110 | 110 |
| Dihydrate gypsum | 30 | — | 100 | 30 | — | 50 |
| Iron sulfate hydrate | — | 30 | — | — | 100 | — |
| Density (kg/m$^3$) | 17.6 | 17.3 | 21.0 | 22.4 | 20.6 | 24.8 |
| Hardness (N) | 114 | 111 | 142 | 131 | 141 | 144 |
| Tensile strength (kPa) | 130 | 135 | 105 | 145 | 123 | 108 |
| Elongation (%) | 170 | 173 | 105 | 203 | 118 | 105 |
| Compressive residual strain (%) | 4.5 | 4.3 | 4.8 | 3.1 | 4.1 | 4.7 |
| Maximum exothermic temperature (° C.) | 141 | 145 | 105 | 132 | 112 | 102 |
| Time required for 10° C. of decrease from maximum exothermic temperature (min.) | 9 | 10 | 8 | 7 | 9 | 7 |
| Color difference (ΔYI) | 3.0 | 2.8 | 1.9 | 2.1 | 1.8 | 1.7 |

TABLE 2

|  | Example 7 | Example 8 | Example 9 |
|---|---|---|---|
| Polyol GP3000 | 100 | 100 | 100 |
| Water | 7.0 | 7.0 | 7.0 |
| Amine catalyst LV33 | 0.4 | 0.4 | 0.4 |
| Silicone foam stabilizer B8110 | 1.0 | 1.0 | 1.0 |
| Stannous octoate MRH110 | 0.2 | 0.2 | 0.2 |
| Polyisocyanate T-80 | 84.1 | 84.1 | 84.1 |
| Isocyanate index | 110 | 110 | 110 |
| Magnesium sulfate hydrate | 10 | 100 | 10 |
| Dihydrate gypsum | — | — | 10 |
| Density (kg/m$^3$) | 17.1 | 20.8 | 17.6 |
| Hardness (N) | 114 | 141 | 121 |
| Tensile strength (kPa) | 130 | 103 | 123 |
| Elongation (%) | 170 | 107 | 143 |
| Compressive residual strain (%) | 4.5 | 4.8 | 4.7 |
| Maximum exothermic temperature (° C.) | 137 | 118 | 127 |
| Time required for 10° C. of decrease from maximum exothermic temperature (min.) | 9 | 7 | 8 |
| Color difference (ΔYI) | 3.0 | 1.2 | 2.1 |

TABLE 3

|  | Comparative Example 1 | Comparative Example 2 | Comparative Example 3 |
|---|---|---|---|
| Polyol GP3000 | 100 | 100 | 100 |
| Water | 7.0 | 7.0 | 7.0 |
| Amine catalyst LV33 | 0.4 | 0.4 | 0.5 |
| Silicone foam stabilizer B8110 | 1.0 | 1.0 | 1.0 |
| Stannous octoate MRH110 | 0.2 | 0.2 | 0.2 |
| Polyisocyanate T-80 | 84.1 | 84.1 | 84.1 |
| Isocyanate index | 110 | 110 | 110 |
| Polyethylene powder | — | 30.0 | 100.0 |
| Density (kg/m$^3$) | 16.9 | 18.0 | Impossible to measure |
| Hardness (N) | 128 | 122 |  |
| Tensile strength (kPa) | 97 | 85 |  |
| Elongation (%) | 87 | 83 |  |
| Compressive residual strain (%) | 10.8 | 7.4 |  |
| Maximum exothermic temperature (° C.) | 187 | 143 |  |
| Time required for 10° C. of decrease from maximum exothermic temperature (min.) | 22 | 18 |  |
| Color difference (ΔYI) | 12.1 | 5.1 |  |

As shown in Tables 1 and 2, in Examples 1 to 9, the maximum exothermic temperature at foaming and curing could be suppressed to 145° C. or lower, the time required for 10° C. of decrease from the maximum temperature could be shortened to 10 minutes or less, and the color difference could be reduced to 3.0 or less. Therefore, the resulting flexible polyurethane foam had a low density of 17.3 to 24.8 kg/m$^3$, a hardness of 111 to 144 N, a tensile strength of 105 to 145 kPa, an elongation of 105 to 203%, and a compressive residual strain of 3.1 to 4.8%. In particular, in Example 9, by blending magnesium sulfate heptahydrate and dihydrate gypsum in total amount as small as 20 parts by weight, the maximum exothermic temperature could be suppressed to 127° C. and color difference could be reduced to 2.1 with a low density of 17.6 kg/m$^3$ and thus best balanced performance could be obtained.

In general, in the flexible polyurethane foam for use as furniture such as mattress, rough standard of the color difference is 5 or less and, in the flexible polyurethane foam for use as seat materials for automobiles and pads for furniture, the compressive residual strain is 5% or less, so that such standards could be sufficiently satisfied. The reason why the exothermic temperature could be suppressed to a low temperature, the color difference could be sufficiently reduced, and a low foaming flexible polyurethane foam could be obtained as mentioned above is presumed to be based on the lowered exothermic temperature caused by deprivation of heat of vaporization through the evaporation of water, the water being formed through decomposition of the inorganic compound hydrate having a specific gravity of 1.5 to 4.0 induced by the heat generation at foaming and curing.

To the contrary, as shown in Table 3, in the case that the inorganic compound hydrate having a specific gravity of 1.5 to 4.0 is not contained (Comparative Example 1), the maximum exothermic temperature reached a high temperature of 187° C. and the time required for 10° C. of decrease from maximum exothermic temperature became a long period of 22 minutes. Therefore, the color difference showed a high value of 12.1 and the compressive residual strain showed a high value of 10.8%. In the case that the polyethylene powder was added in an amount of 30 parts by weight (Comparative Example 2), since the time required for 10° C. of decrease from maximum exothermic temperature was long, i.e., 18 minutes, namely, since the time for which the foam was maintained at a high temperature was long, the color difference increased to 5.1. As mentioned above, rough standard of the color difference is 5 or less and thus such a standard could not be satisfied. Furthermore, in the case that the polyethylene powder was blended in an amount of 100 parts by weight (Comparative Example 3), the polyurethane raw material became paste-like one and hence foaming was impossible.

On the results of the above Example 1 and Comparative Example 2, a relationship between the exothermic temperature (° C.) and the elapsed time (minute) was shown as a graph in FIG. 1. As shown in FIG. 1, it is understood that the degree of decrease of temperature after the maximum exothermic temperature is larger in Example 1 than in Comparative Example 2. The time T1 required for 10° C. of decrease from maximum exothermic temperature (141° C.) was 9 minutes in Example 1, while the time T2 required for 10° C. of decrease from maximum exothermic temperature (143° C.) was 18 minutes in Comparative Example 2. A rapid temperature decrease from the maximum exothermic temperature was observed by the water formed by the decomposition of dihydrate gypsum in Example 1 but the polyethylene powder functioned so as to maintain the temperature in Comparative Example 2 and hence a slow temperature decrease from the maximum exothermic temperature was observed.

It is also possible to change and specify the present embodiment.

As the inorganic compound hydrate having a specific gravity of 1.5 to 4.0, sodium carbonate monohydrate ($Na_2CO_3 \cdot H_2O$, specific gravity: 2.25, decomposition temperature: 100° C.), calcium dihydrogen phosphate monohydrate ($Ca(H_2PO_4)_2 \cdot H_2O$, specific gravity: 2.22, decomposition temperature: 109° C.), or the like can be also used.

A water-absorbing material which swells with absorbing water and absorbs heat with evaporating the absorbed water at heating, e.g., a water-insoluble (meth)acrylic water-absorbing resin containing a (meth)acrylic acid unit or a (meth)acrylate salt unit as a main constituting unit can be also blended in a water-containing state.

A water-absorbing porous inorganic material, e.g., hemihydrate gypsum, zeolite, diatomaceous earth, active carbon, or the like can be also blended in a water-containing state.

The flexible polyurethane foam can be used as automobile interior materials such as a lining material for doors of automobiles and a ceiling material, other quilting materials, and the like.

Furthermore, the following will describe technical ideas which can be comprehended from the above embodiments.

The process for producing a flexible polyurethane foam in the invention, wherein the above iron sulfate hydrate is preferably monohydrate to pentahydrate of iron sulfate and the calcium sulfate hydrate is preferably dihydrate of calcium sulfate. According to the production process, the inorganic compound hydrate can be gradually decomposed at 100° C. or higher along the temperature increase at foaming and curing by the reaction of the polyurethane raw material to form water.

The process for producing a flexible polyurethane foam in the invention, wherein the above exothermic temperature is preferably set at 170° C. or lower. According to the production process, scorch can be prevented and excellent physical properties of the resulting flexible polyurethane foam, such as color difference and compressive residual strain, can be achieved.

The process for producing a flexible polyurethane foam in the invention, wherein a plurality of the above inorganic compound hydrates are preferably blended. According to the production process, the function of the inorganic compound hydrate can be exhibited in a wider temperature range, so that the exothermic temperature at foaming and curing can be effectively lowered and also the blending amount of the inorganic compound hydrate can be reduced.

A flexible polyurethane foam obtainable by reacting a polyurethane raw material containing a polyol, a polyisocyanate, a blowing agent, and a catalyst, which has a density of 15 to 25 kg/m$^3$, a compressive residual strain determined by JIS K 6400-4:2004 (Method A) of 5% or less, and a color difference between a high-temperature part and a low-temperature part at foaming and curing of 5 or less and contains an inorganic compound hydrate having a specific gravity of 1.5 to 4.0. In the case thus constituted, the foam can exhibit suitable physical properties as a flexible polyurethane foam for use as a cushioning material or the like.

While the invention has been described in detail and with reference to specific embodiments thereof, it will be apparent to one skilled in the art that various changes and modifications can be made therein without departing from the spirit and scope thereof.

This application is based on Japanese patent application No. 2004-220409 filed on Jul. 28, 2004 and No. 2004-331737 filed on Nov. 16, 2004, the entire contents thereof being hereby incorporated by reference.

What is claimed is:

1. A process for producing a flexible polyurethane foam comprising blending (i) a polyurethane raw material containing a polyol, a polyisocyanate, 7 to 13 parts by weight of water as a blowing agent based on 100 parts by weight of the polyol, and a catalyst with (ii) an inorganic compound hydrate having a specific gravity of 1.5 to 4.0; and reacting the polyurethane raw material to effect foaming, followed by curing by passing through a heating furnace, wherein an increase in exothermic temperature owing to the foaming and curing is diminished by evaporation of water formed through decomposition of the inorganic compound hydrate, and wherein said inorganic compound hydrate has a decomposition temperature of from 100 to 170° C., and said exothermic temperature of the foam during foaming and curing is suppressed to 170° C. or lower.

2. The process for producing a flexible polyurethane foam according to claim 1, wherein said inorganic compound hydrate is an iron sulfate hydrate, a calcium sulfate hydrate, or a magnesium sulfate hydrate.

3. The process for producing a flexible polyurethane foam according to claim 2, wherein said iron sulfate hydrate is monohydrate to pentahydrate of iron sulfate.

4. The process for producing a flexible polyurethane foam according to claim 2, wherein said calcium sulfate hydrate is dihydrate of calcium sulfate.

5. The process for producing a flexible polyurethane foam according to claim 1, wherein a plurality of the inorganic compound hydrates are blended.

* * * * *